(12) United States Patent
Chan et al.

(10) Patent No.: US 8,864,606 B2
(45) Date of Patent: Oct. 21, 2014

(54) SPORTS APPLICATIONS FOR WIND PROFILE SYSTEMS

(75) Inventors: Alistair K. Chan, Bainbridge, WA (US);
Roderick A. Hyde, Redmond, WA (US);
Jordin T. Kare, Seattle, WA (US);
Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1064 days.

(21) Appl. No.: 12/215,676

(22) Filed: Jun. 27, 2008

(65) Prior Publication Data

US 2010/0184534 A1 Jul. 22, 2010

Related U.S. Application Data

(63) Continuation-in-part of application No. 12/215,710, filed on Jun. 27, 2008, and a continuation-in-part of application No. 12/215,705, filed on Jun. 27, 2008, and a continuation-in-part of application No. 12/215,675, filed on Jun. 27, 2008.

(51) Int. Cl.
| | |
|---|---|
| *A63B 57/00* | (2006.01) |
| *A63B 69/36* | (2006.01) |
| *A63F 9/24* | (2006.01) |
| *A63F 13/00* | (2014.01) |
| *G06F 17/00* | (2006.01) |
| *G06F 19/00* | (2011.01) |
| *G01W 1/10* | (2006.01) |

(52) U.S. Cl.
CPC .................................... *G01W 1/10* (2013.01)
USPC ............................. 473/407; 473/131; 463/3

(58) Field of Classification Search
USPC ................................................... 473/131, 407
See application file for complete search history.

(56) References Cited

U.S. PATENT DOCUMENTS

| | | | |
|---|---|---|---|
| 4,864,854 A * | 9/1989 | vanLeemput | 73/170.07 |
| 5,146,557 A | 9/1992 | Yamrom et al. | |
| 5,507,485 A | 4/1996 | Fisher | |
| 5,592,171 A | 1/1997 | Jordan | |
| 5,598,359 A | 1/1997 | Montag et al. | |
| 5,610,705 A | 3/1997 | Brosnan et al. | |
| 5,718,639 A * | 2/1998 | Bouton | 473/151 |
| 5,797,809 A * | 8/1998 | Hyuga | 473/407 |
| 6,113,504 A * | 9/2000 | Kuesters | 473/353 |
| 6,133,946 A | 10/2000 | Cavallaro et al. | |
| 6,134,500 A | 10/2000 | Tang et al. | |
| 6,141,086 A | 10/2000 | Vahala et al. | |
| 6,217,444 B1 | 4/2001 | Kataoka et al. | |
| 6,322,455 B1 | 11/2001 | Howey | |
| 6,542,797 B2 | 4/2003 | Lohmiller | |

(Continued)

OTHER PUBLICATIONS

Chen, Hsinchun et al.; "Expert Prediction, Symbolic Learning, and Neural Networks an Experiment on Greyhound Racing"; IEEE Expert; Dec. 1994; pp. 21-27; vol. 9,No. 6; IEEE.

(Continued)

*Primary Examiner* — Kevin Y Kim
(74) *Attorney, Agent, or Firm* — Foley & Lardner LLP (57) ABSTRACT

A system is generally described which includes a sports system. The sports system includes a wind profile detector, a reference location, and a user interface device. Among other information the user interface device may provide information based on the wind profile from the wind profile detector and the reference location.

34 Claims, 8 Drawing Sheets

(56) References Cited

U.S. PATENT DOCUMENTS

| | | |
|---|---|---|
| 6,600,991 B1 | 7/2003 | Jardin |
| 6,654,102 B1 | 11/2003 | Modares et al. |
| 6,753,784 B1 | 6/2004 | Sznaider et al. |
| 6,823,263 B1 * | 11/2004 | Kelly et al. ............... 702/3 |
| 7,094,164 B2 | 8/2006 | Marty et al. |
| 7,270,601 B2 | 9/2007 | Takahashi et al. |
| 7,739,823 B2 | 6/2010 | Shapira et al. |
| 7,945,355 B2 | 5/2011 | Akalinli et al. |
| 8,170,727 B2 | 5/2012 | Deker |
| 2003/0093219 A1 | 5/2003 | Schultz et al. |
| 2003/0107490 A1 | 6/2003 | Snzider et al. |
| 2003/0163278 A1 * | 8/2003 | Clark et al. ............ 702/138 |
| 2004/0158337 A1 * | 8/2004 | Forest ..................... 700/91 |
| 2005/0221905 A1 * | 10/2005 | Dunne et al. ............ 473/131 |
| 2005/0227791 A1 * | 10/2005 | McCreary et al. ........ 473/407 |
| 2007/0026974 A1 | 2/2007 | Marty et al. |
| 2007/0026975 A1 | 2/2007 | Marty et al. |
| 2007/0032306 A1 * | 2/2007 | Zanzucchi et al. ....... 473/151 |
| 2007/0171397 A1 | 7/2007 | Halldorsson et al. |
| 2007/0293289 A1 | 12/2007 | Loeb |
| 2007/0296723 A1 | 12/2007 | Williams |
| 2008/0021651 A1 * | 1/2008 | Seeley et al. ................. 702/3 |
| 2008/0182685 A1 | 7/2008 | Marty et al. |
| 2008/0200287 A1 | 8/2008 | Marty et al. |
| 2008/0312010 A1 | 12/2008 | Marty et al. |
| 2009/0036237 A1 | 2/2009 | Nipper et al. |
| 2009/0075761 A1 * | 3/2009 | Balardeta et al. ........ 473/407 |
| 2009/0082139 A1 * | 3/2009 | Hart ....................... 473/407 |
| 2010/0029415 A1 | 2/2010 | Lindsay |

OTHER PUBLICATIONS

Crowder, Martin et al.; "Dynamic Modelling and Prediction of English Football League Matches for Betting"; The Statistician; 2002; pp. 157-168; vol. 51; Part 2; Royal Statistical Society.

Lessmann, Stefan et al.; "Identifying Winners of Competitive Events:A SVM-based Classification model for Horserace Prediction"; European Journal of Operational Research; 2009 (available online Mar. 18, 2008); pp. 569-577; vol. 196; Elsevier B. V.

Min, Byungho et al. "A Compound Framework for Sports Results Prediction: A football Case Study"; Knowledge-Based Systems; 2008 (available online Mar. 29, 2008); pp. 551-562; vol. 21; Elsevier B. V.

Strauch, R.G. et al.; "The Colorado Wind-Profiling Network"; Journal of Atmospheric and Oceanic Technology; Mar. 1984; pp. 37-49.

"Particle Tracking Velocimetry"; Wikipedia, the Free Encyclopedia; pp. 1-2; located at: http://en.wikipedia.org/wiki/Particle_tracking_velocimetry.

* cited by examiner

SPORTS APPLICATIONS FOR WIND PROFILE SYSTEMS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/215,710, entitled METHODS OF USING ENVIRONMENTAL CONDITIONS IN SPORTS APPLICATIONS, naming Alistair K. Chan, Roderick A. Hyde, Jordin T. Kare and Lowell L. Wood, Jr. as inventors, filed 27, Jun., 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/215,705, entitled METHODS OF PROCESSING WIND PROFILE INFORMATION IN SPORTS APPLICATIONS, naming Alistair K. Chan, Roderick A. Hyde, Jordin T. Kare and Lowell L. Wood, Jr. as inventors, filed 27, Jun., 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/215,675, entitled WIND PROFILE SYSTEMS FOR SPORTING APPLICATIONS, naming Alistair K. Chan, Roderick A. Hyde, Jordin T. Kare and Lowell L. Wood, Jr. as inventors, filed 27, Jun., 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

The description herein generally relates to the field of using remote sensing techniques to detect various environmental conditions such as but not limited to wind profiles at a distance from a sports participant. The detected environmental conditions are then communicated to the participant or other observers. Computer simulation and modeling may be used to provide suggestions or recommendations to the participants or may be used to show observers or participants how the environmental conditions may affect the participants' performance.

Environmental conditions are a variable factor to a sports participant's performance. For example, golfers are very interested how the wind may affect the flight of the ball once the ball is struck. Conventionally golfers have very little information about the wind conditions throughout the trajectory of the ball. Golfers may have some indication of the wind at the point that they are standing and possibly information down the fairway from the observation of a flag blowing in the wind or the like, however such information may have little accuracy, may be unpredictable, and may be very limited. In other sports conventionally there is also a deficiency in the amount and quality of wind or other environmental conditions information that is available to a sports participant or observers.

Accordingly, there is a need for systems and methods for applications of remote sensing of environmental conditions in sports.

SUMMARY

In one aspect, methods which utilize the described systems may be used for applying wind profile information in a variety of sports applications.

In addition to the foregoing, other method aspects may be described in the claims, drawings, and text forming a part of the present disclosure and may be implied from the workings of the systems shown and described.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. Also various structural elements may be employed depending on design choices of the system designer.

In one aspect a golf system includes a wind profile detector, a reference location, and a user interface device. The user interface device provides information based on the wind profile from the wind profile detector and the location.

In another aspect a football system includes a wind profile detector, an interface device, and a reference location. The interface device provides information based on the wind profile from the wind profile detector and a reference location.

In yet another aspect a sailing system includes a wind profile detector and a reference location. The system also includes a user interface device that provides information based on the wind profile from the wind profile detector and the reference location.

In still yet another aspect a baseball system includes a wind profile detector and a reference location. The system also includes a user interface device that provides information based on the wind profile from the wind profile detector and the reference location.

In yet a further aspect a racing system includes a wind profile detector and a reference location. The system includes a user interface device that provides information based on the wind profile from the wind profile detector and the reference location.

In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

The foregoing summary is illustrative only and is not intended to be in any way limiting. In addition to the illustrative aspects, embodiments, and features described above, further aspects, embodiments, and features will become apparent by reference to the drawings and the following detailed description, of which.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.). Further, those skilled in the art will recognize that the mechanical structures disclosed are exemplary structures and many other forms and materials may be employed in constructing such structures.

Figure 1:
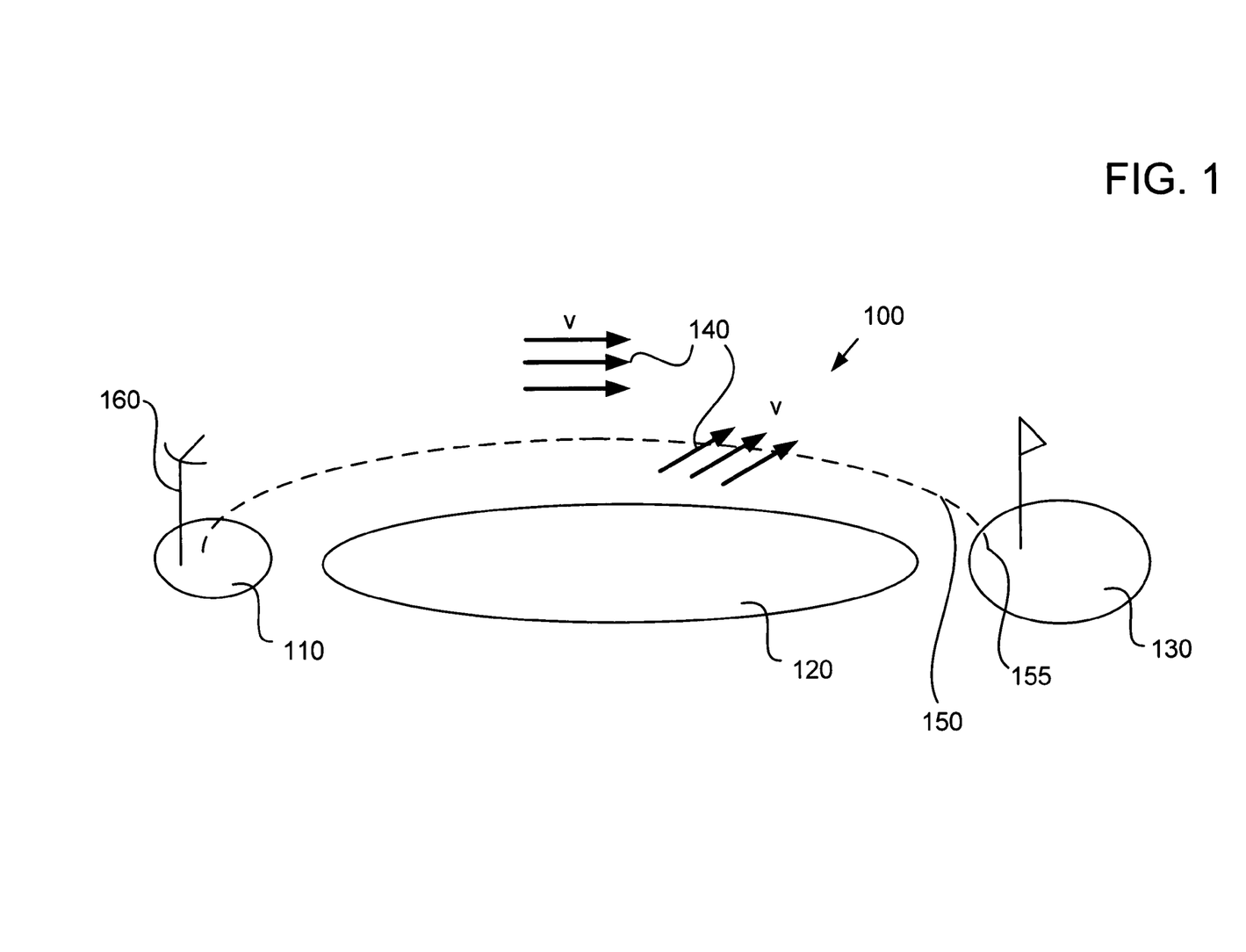
FIG. 1 is an exemplary diagram of a golf hole and a wind profile system in accordance with an exemplary embodiment.

Referring to FIG. 1, an exemplary golf hole is depicted. Golf hole 100 may include a tee area 110, a fairway 120, and a green area 130. Wind having a speed v and direction shown by the arrows 140 may be variable throughout the three-dimensional space associated with the length, width, and height above the ground of golf hole 100. Conventionally a golfer standing in tee box 110 may not be aware of the winds along the estimated trajectory of his ball, depicted here as trajectory 150. In accordance with an exemplary embodiment, a remote sensing system 160, such as a doppler radar wind profiler or other wind profiling system or device capable of determining wind speed at least two remote locations may be used to provide information to a golfer about the wind profile throughout the estimated trajectory 150 or through a portion of trajectory 150. In another exemplary embodiment, it may be beneficial for a golfer to simply receive information that has been processed which provides suggestions or recommendations based on the wind profiles detected.

Various wind profiling devices and systems may be used to provide wind profile information in systems such as the systems described. For example, Sodar (sonic detection and ranging) systems may be used to remotely measure the vertical turbulence structure and the wind profile of the lower layer of the atmosphere. Sodar systems have many similarities to radar (radio detection and ranging) systems except that sound waves rather than radio waves are used for detection. Other names used for sodar systems include sounder, echosounder and acoustic radar. Sonar, which stands for sound navigation ranging, is a similar system used to detect the presence and location of objects submerged in water (e.g., submarines) by means of sonic waves reflected back to the source. Sodar systems are similar except the medium is air instead of water and reflection is due to the scattering of sound by atmospheric turbulence.

Conventional sodar systems operate by sending out an acoustic pulse and then listening for the return signal for a short period of time. Generally, both the intensity and the Doppler (frequency) shift of the return signal are analyzed to determine the wind speed, wind direction and turbulent character of the atmosphere. A profile of the atmosphere as a function of height can be obtained by analyzing the return signal at a series of times following the transmission of each pulse. The return signal recorded at any particular delay time provides atmospheric data for a height that can be calculated based on the speed of sound. Sodar systems typically have maximum ranges varying from a few hundred meters up to several hundred meters or higher. Maximum range is conventionally achieved at locations that have low ambient noise and moderate to high relative humidity. At desert locations, sodar systems tend to have reduced altitude performance because sound attenuates more rapidly in dry air.

Sodar systems can be used in any application where the winds aloft or the atmospheric stability must be determined, particularly in cases where time and cost are important factors.

Doppler radar devices are also capable of wind profiling and operate using principles similar to those used by Doppler Sodars except that electromagnetic (EM) signals are used rather than acoustic signals to remotely sense winds aloft. Conventionally, the radar can sample along each of five beams: one is aimed vertically to measure vertical velocity, and four are tilted off vertical and oriented orthogonal to one another to measure the horizontal components of the air's motion. In an exemplary implementation, the radar transmits an electromagnetic pulse along each of the antenna's pointing directions. The duration of the transmission determines the length of the pulse emitted by the antenna, which in turn corresponds to the volume of air illuminated (in electrical terms) by the radar beam. Small amounts of the transmitted energy are scattered back (referred to as backscattering) toward and received by the radar. Delays of fixed intervals are built into the data processing system so that the radar receives scattered energy from discrete altitudes, referred to as range gates. The Doppler frequency shift of the backscattered energy is determined, and then used to calculate the velocity of the air toward or away from the radar along each beam as a function of altitude. The source of the backscattered energy (radar "targets") is small-scale turbulent fluctuations that induce irregularities in the radio refractive index of the atmosphere. The radar is most sensitive to scattering by turbulent eddies whose spatial scale is ½ the wavelength of the radar, for example.

A wind profiler's ability to measure winds is based on the assumption that the turbulent eddies that induce scattering are carried along by the mean wind. The energy scattered by these eddies and received by the profiler is orders of magnitude smaller than the energy transmitted. However, if sufficient samples can be obtained, then the amplitude of the energy scattered by these eddies can be clearly identified above the background noise level, then the mean wind speed and direction within the volume being sampled can be determined. The radial components measured by the tilted beams are the vector sum of the horizontal motion of the air toward or away from the radar and any vertical motion present in the beam. Using appropriate trigonometry, the three-dimensional meteorological velocity components (u,v,w) and wind speed and wind direction are calculated from the radial velocities with corrections for vertical motions.

Another technique, known as Laser Doppler velocimetry (LDV, also known as laser Doppler anemometry, or LDA) may also be used for measuring the direction and speed of fluids like air and water. In an exemplary configuration, LDV crosses two beams of collimated, monochromatic, and coherent laser light in the flow of the fluid being measured. The two beams are usually obtained by splitting a single beam, thus ensuring coherency between the two. The two beams are made to intersect at their waists (the focal point of a laser beam), where they interfere and generate a set of straight fringes. The sensor is then aligned to the flow such that the fringes are perpendicular to the flow direction. As particles pass through the fringes, they reflect light (only from the regions of constructive interference) into a photodetector and since the fringe spacing d is known (from calibration), the velocity can be calculated to be $$u = f \times d$$

where f is the frequency of the signal received at the detector. Another form of flow sensor that is typically referred to as a laser Doppler velocimeter has a completely different approach akin to an interferometer. In this exemplary device a beam of monochromatic laser light is sent into the flow, and particles will reflect light with a Doppler shift corresponding to their velocities. The shift can be measured by interfering the reflected beam with the original beam, which will form beats according to the frequency difference.

Ocean surface waves or other fluid body surface waves can be measured by several radar remote sensing techniques. Several instruments based on a variety of different concepts and techniques are available to the user and these are all often called Wave Radars.

Figure 2:
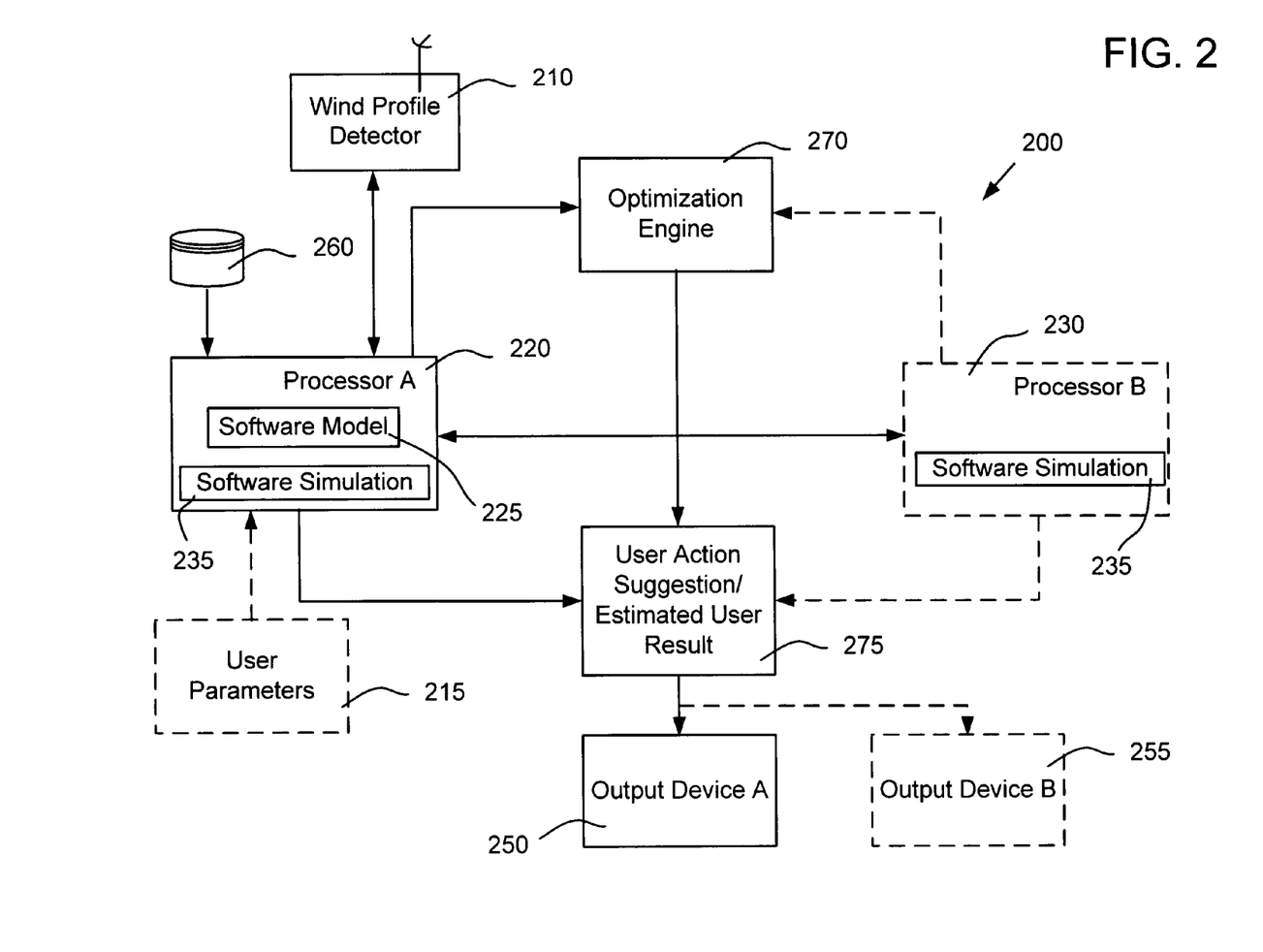
FIG. 2 is an exemplary block diagram of a wind profile system for sports applications in accordance with an exemplary embodiment.

Wind profile detectors or other remote detectors of environmental conditions like those described above or others which may be equally applicable and may be used in a variety of systems and in a variety of sports applications. Referring now to FIG. 2, a system 200 for processing wind profile information in sports application may include a wind profile detector 210. Wind profile detector 210 provides wind profile information using any of a variety of electronic remote sensing techniques and devices. Additionally wind profile detector 210 may be replaced or augmented with other remote sensing devices which sense a variety of other environmental conditions, such as but not limited to water surface waves, temperature, pressure, etc. System 200 may also include a first processor 220 configured with software to carry out computer modeling 225 of at least one user action in a sports context. For example, the computer model 225 may be capable of modeling the output of a user based on various user parameters 215 which may be established empirically or analytically or a combination thereof. System 200 may further include computer software running on at least one of the first processor 220 or a second processor 230 (or other processors). The computer software comprising a computer simulation system 235, the computer simulation system simulating at least one user action in the presence of the detected wind profile information from wind profile detector 210 or other environmental condition information.

In accordance with an exemplary embodiment, computer simulation system 235 may be configured to generate an estimated user result, for example if the golfer is the user, the estimated user result may be the estimated resultant ball destination 155 or the estimated ball trajectory 150. Also in an exemplary embodiment computer simulation system 235 may be configured to generate a user action suggestion. In a further exemplary embodiment, an output device 250 and/or 255 may be accessible by a first user. Output device 250 and/or 255 may be configured to provide a representation of the estimated user result. Output device 250 and/or 255 may be any of a variety of output devices such as but not limited to video display devices, audio devices, printout devices, etc. For example, an output device may be accessible by a first user. The output device may be configured to provide a representation of the estimated user result and/or a variety of other information. A computer program may be running on at least one of the first processor 220, the second processor 230 or a third processor which may be associated with one of output devices 250 and 255. The computer program may be configured to generate suggestions about how to use the estimated user result information by the first user and such a suggestion may be provided to output devices 250 and/or 255. For example, a golfer may need to select a club for a shot. Based on where the golfer would like the ball to land, based on user parameters for the golfer, and based on the wind profile detector information, an estimated user result for example where the ball may land may be generated and a club selection suggestion may be provided to the user. In another exemplary embodiment, the suggestion to the user may be an action, such as but not limited to in the case of the golfer, how hard to swing the club and/or whether to place a specific type of spin on the ball (hook, slice, backspin, etc.)

In accordance with an exemplary embodiment, an optimization engine 270 may receive inputs from at least one of processor 220 and/or processor 230. Optimization engine 270 may be used to generate a user action suggestion and/or an estimated user result 275 based on the attempted minimization or maximization of an objective function (e.g., maximizing distance, minimizing deviation from a destination, minimizing time, etc.). Optimization engine 270 may employ any of a variety of optimization techniques, including but not limited to least squares, regression analysis, projection techniques, stochastic optimization techniques, numerical optimization techniques, vector techniques, genetic programming techniques, simulated annealing techniques, artificial intelligence techniques and the like.

In one exemplary embodiment, an output device may be configured to be accessible by a second user. The output device may be configured to provide a representation of the estimated user result, among other information. The second user may desire access to such information in the case that the second user is a spectator, a media commentator, a coach, a competitor, or other observer. In one instance, the second output device may be configured to communicate an estimated user result or other information from system 200 to an audience of a second user, such as but not limited to a television audience of a television commentator. In another exemplary use, an output device communicating the estimated user result may be used in a betting facility and may be used by the betting facility or by the bettors to factor the estimated user result into the calculation/estimation of odds and/or decisions for placing a particular bet.

Referring again to FIG. 2, wind profile detector may be any of a variety of devices including but not limited to radio detection and ranging (RADAR) sensing, laser imaging detection and ranging (LIDAR) sensing, sonic detection and ranging (SODAR) sensing, Doppler RADAR sensing, laser Doppler velocimetry sensing. Further, in an exemplary embodiment, the wind profile information may include a measure of wind speed at two or more positions. The wind profile information may also include a measure of wind speed and direction at two or more positions.

In one exemplary embodiment, it may be desirable to include a database 260 with system 200 or accessible by system 200. Database 260 may contain, among other information a baseline of wind profile information, user performance information, and/or user parameter information.

The application of a system such as system 200 may be many and varied. For example, the user may be but is not limited to a golfer, a baseball player, a football player, a football kicker, a paintball participant, a sailor, a shooter, a skeet shooter, an archer, a hang glider, a skydiver, a wind driven sport participant, a surfer, a boater, a windsurfer, a parasailor, a runner, a horse and rider, a dog, a car driver, a bicycle rider. Even though the applications and users may be many and varied, the software may be easily customized for use in each of the particular applications. Further, the basic use of remote sensing of environmental conditions may be beneficial to each of these varied users.

Just as the applications and users of a system like system 200 are many and varied; the outputs from its use are also potentially many and varied. For example, the estimated user result 275 may include, but is not limited to one or more of the following: an estimated trajectory, an estimated impact point, an estimated force, an estimated time, an estimated energy usage, an estimated fuel usage, among many other possibilities.

Computer modeling of the user may be accomplished in many different ways. Some of these ways may include but are not limited to a learning algorithm that is capable of learning parameters for a user model, an adaptive algorithm that can adaptively change parameters for a user model, an empirical model developed through data taking, among other possibilities.

In accordance with an exemplary embodiment, the wind profile may be detected at various times depending on the application and desired results from system 200. For example, the wind profile may be detected during estimated user trajectory, at a first time, at a second time, or at any combination of these times or others. In one example, the wind profile that may be detected at a first time and a second time may be determined as a function of the first time and the second time. In another example, the wind profile may be scaled based on at least one other wind profile. Further, the wind profile may be interpolated in space from measurements at two or more points or the wind profile may be extrapolated from measurements at two or more points.

Figure 3:
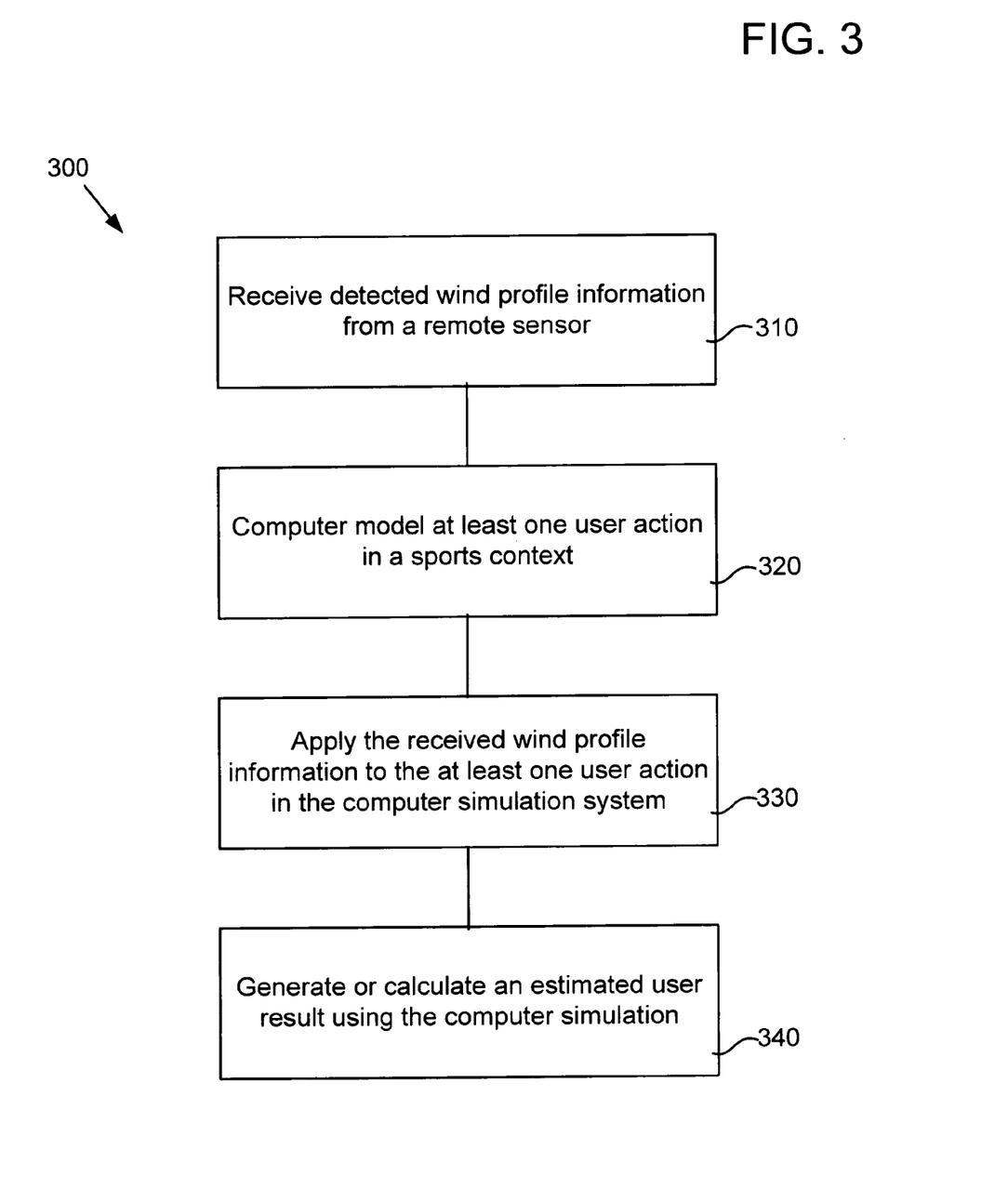
FIG. 3 is an exemplary process diagram in accordance with an exemplary embodiment.

Referring now to FIG. 3, a method 300 of processing wind profile information in sports applications is depicted by the exemplary flow diagram. The method includes receiving wind profile information detected using electronic remote sensing (process 310). As discussed above the remote sensing may include any of a variety of techniques and devices. The method also includes computer modeling at least one user action in a sports context (process 320). The computer model may be generated by any of a variety of techniques, as discussed above. The wind profile information may then be applied as an input to the computer simulation system and be applied to the at least one user action in the computer simulation system (process 330). The computer simulation system may then generate or calculate an estimated user result (process 340), which may be useful to a user of the system whether that user is the participant in the sport or another observer, as discussed above.

In one exemplary embodiment, a representation of the estimated user result may be delivered to a device accessible by a first user. The representation may be in any of a variety of forms including but not limited to text information, video information, audio information, tactile information, etc. The user may then be required to use the representation information in order to improve the user's performance or to attempt to achieve some other desired objective. In one embodiment, the system may provide to the user a suggested action and/or a suggestion on what type of action the user should take.

In accordance with another exemplary embodiment, the representation of an estimated user result may be delivered to or communicated to a second user (as discussed above) such as a coach, spectator, or commentator, etc. in the same way or in a different way than it is communicated to the first user or the sports participant. The second user may receive among other information an estimated user result. The result may be used for coaching advising, entertainment, betting, etc. Further, information relating to the estimated user result may be communicated to an audience of the second user. Such information may include but is not limited to graphical information about the result, statistical information, betting odds information, etc. Based at least partially on the information received, it may be desirable for a second user to place a bet, or make other types of decisions. It may also be desirable for a commentator to receive such information in order to augment the commentary with commentary relating to the information. Competitors may also be the second user in which case the competitors may find it beneficial to be in receipt of the estimated user result in order to make decisions of a competitive nature.

Figure 4:
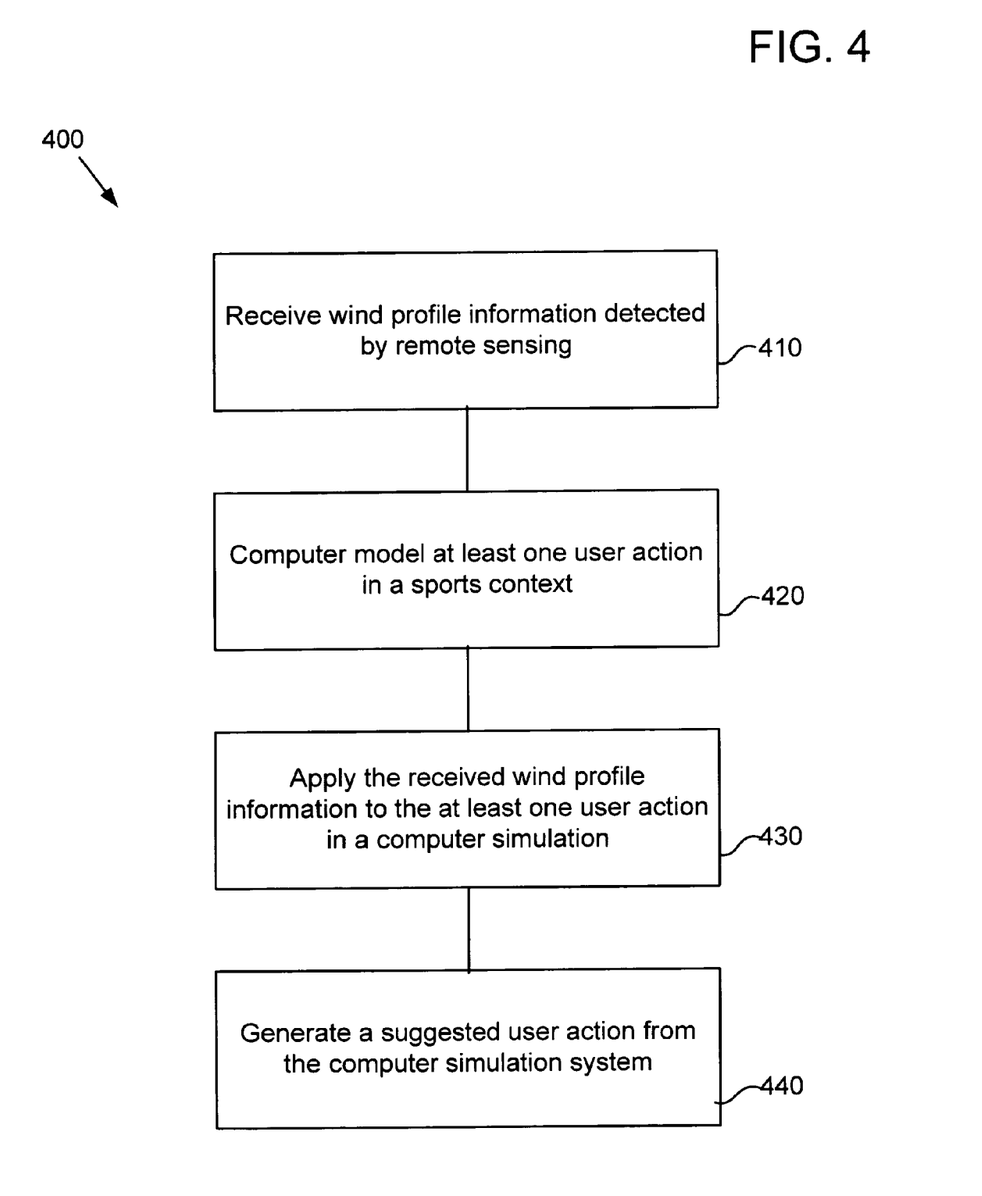
FIG. 4 is another exemplary process diagram in accordance with an exemplary embodiment.

Referring now to FIG. 4, another exemplary process 400 of processing wind profile information in sports applications is depicted. Process 400 includes receiving wind profile information that has been detected using electronic remote sensing (process 410). The remote sensing may be of any of the varieties previously discussed. A computer model is set up to model at least one user action in a sports context (process 420). The received wind profile information may be applied to the at least one user action in a computer simulation (process 430). A suggested user action may then be generated from the computer simulation system (process 440).

Figure 5:
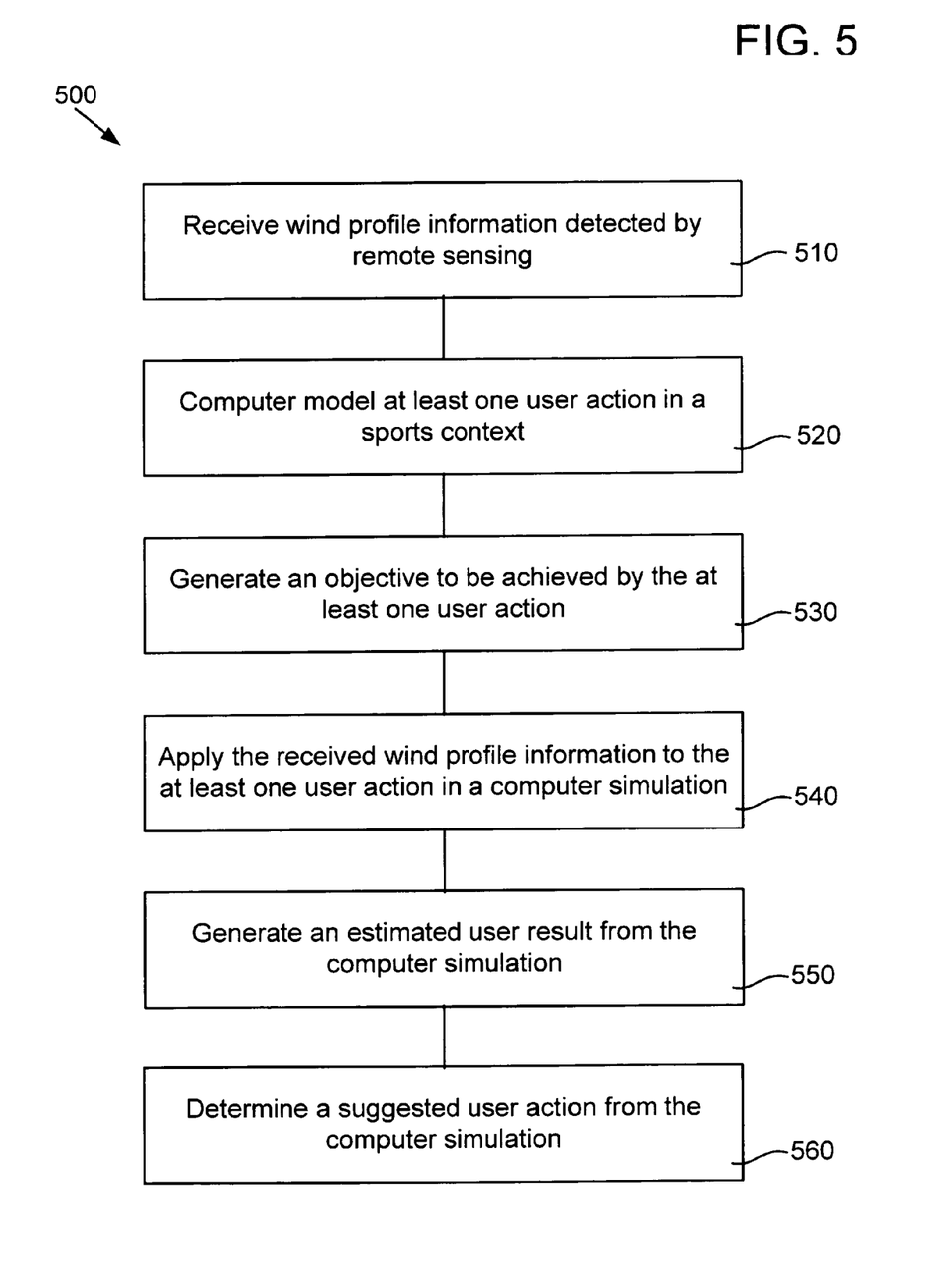
FIG. 5 is yet another exemplary process diagram in accordance with an exemplary embodiment.

Referring now to FIG. 5, yet another exemplary process 500 of processing wind profile information in sports applications is depicted. Exemplary process 500 includes receiving wind profile information detected using any of the variety of electronic remote sensing techniques as discussed (process 510). Exemplary process 500 further includes computer modeling at least one user action in a sports context (process 520). An objective to be achieved by the at least one user action is generated (process 530). The objective may be any of a variety of objectives, such as but not limited to reducing error in shot deviation from a goal, among others as discussed previously. The received wind profile information is then applied in a computer smulation (process 540) and an estimated user result is generated from the computer simulation system (process 550). A suggested user action may be determined which is configured to reduce the error between an estimated result and the objective (process 560).

Figure 6:
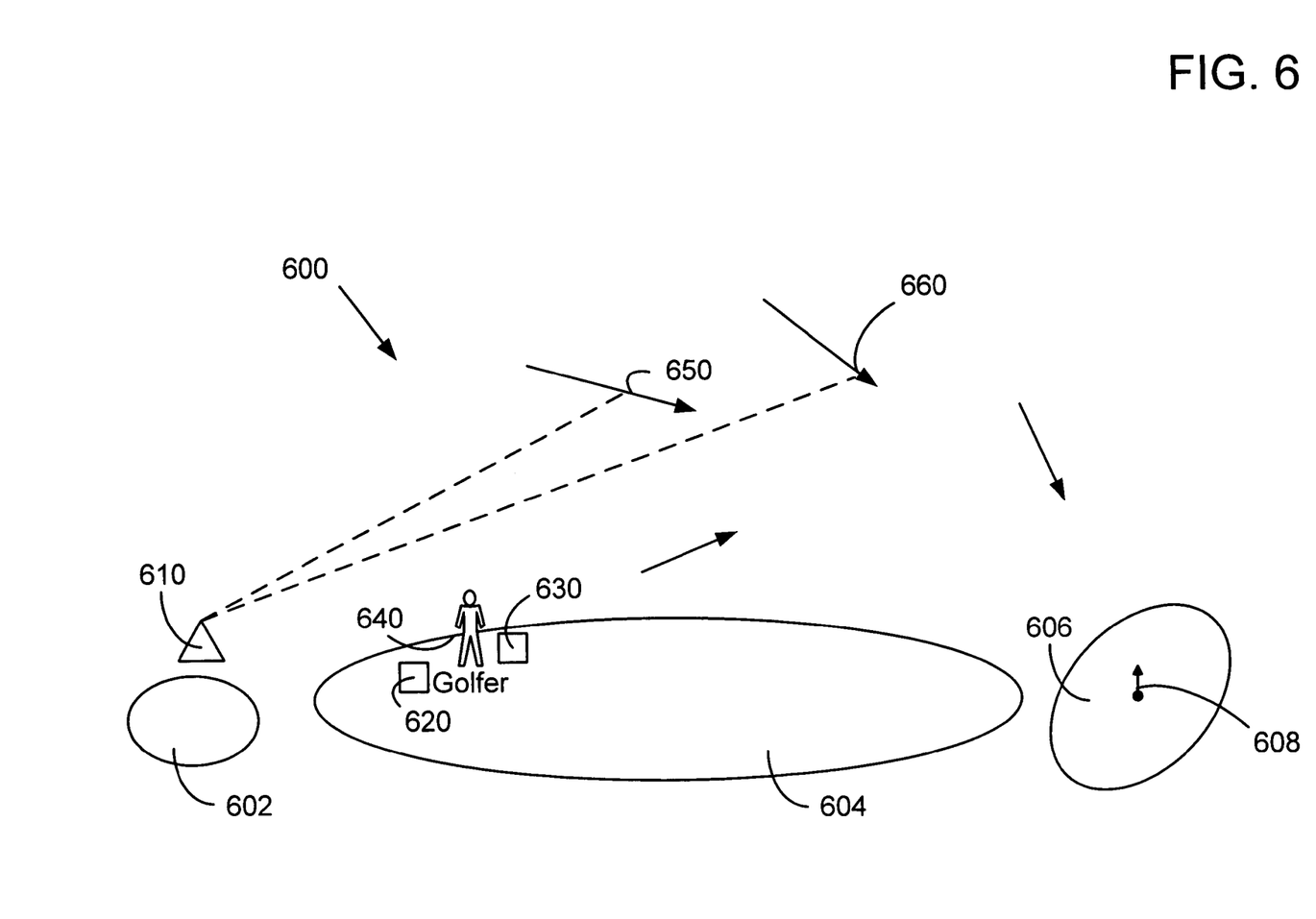
FIG. 6 is an exemplary golf system in accordance with an exemplary embodiment.

Referring now to FIG. 6, a golf system 600 is depicted. Golf system 600 is depicted on a golf course including a tee area 602, a fairway 604, and a green 606 having a hole 608. System 600 further includes a wind profile detector 610 and a location device 620. A user interface device 630 is provided that provides information based on the wind profile from wind profile detector 610 and the location of, for example, a golfer 640 from the location device to golfer 640. Wind profile detector 610 may detect wind information remotely at various locations, such as but not limited to points 650 and 660. In an exemplary embodiment, location device 620 may be located in a variety of places including but not limited to coupled to the tee, coupled to a golfer's equipment, coupled to golfer deployed equipment, coupled to site deployed equipment, or located at any of a variety of predetermined sites.

Golf system 600 may be used to provide golfers or other system users with a variety of information. Such information may include but is not limited to a club selection, shot strength, shot direction, lateral ball deviation from a predetermined path, longitudinal ball deviation from a predetermined path, desired ball hook or slice information, ball loft information, an anticipated club, etc. The information provided may be based on a variety of information including but not limited to an anticipated shot strength, an anticipated direction, an anticipated shot loft, an anticipated ball trajectory, anticipated ball parameters, etc.

Golf system 600 may use any of a variety of user interface devices 630. These user interface devices may include but are not limited to a user interface deployed at a golf site, a user interface coupled to the golf club, a user interface coupled to the golf cart, a user interface coupled to the golfer's apparel, a user interface on a handheld device, etc.

Exemplary golf system 600 may also utilize any of a variety of wind profile detectors, including but not limited to those provided in reference to FIG. 2 above.

Figure 7:
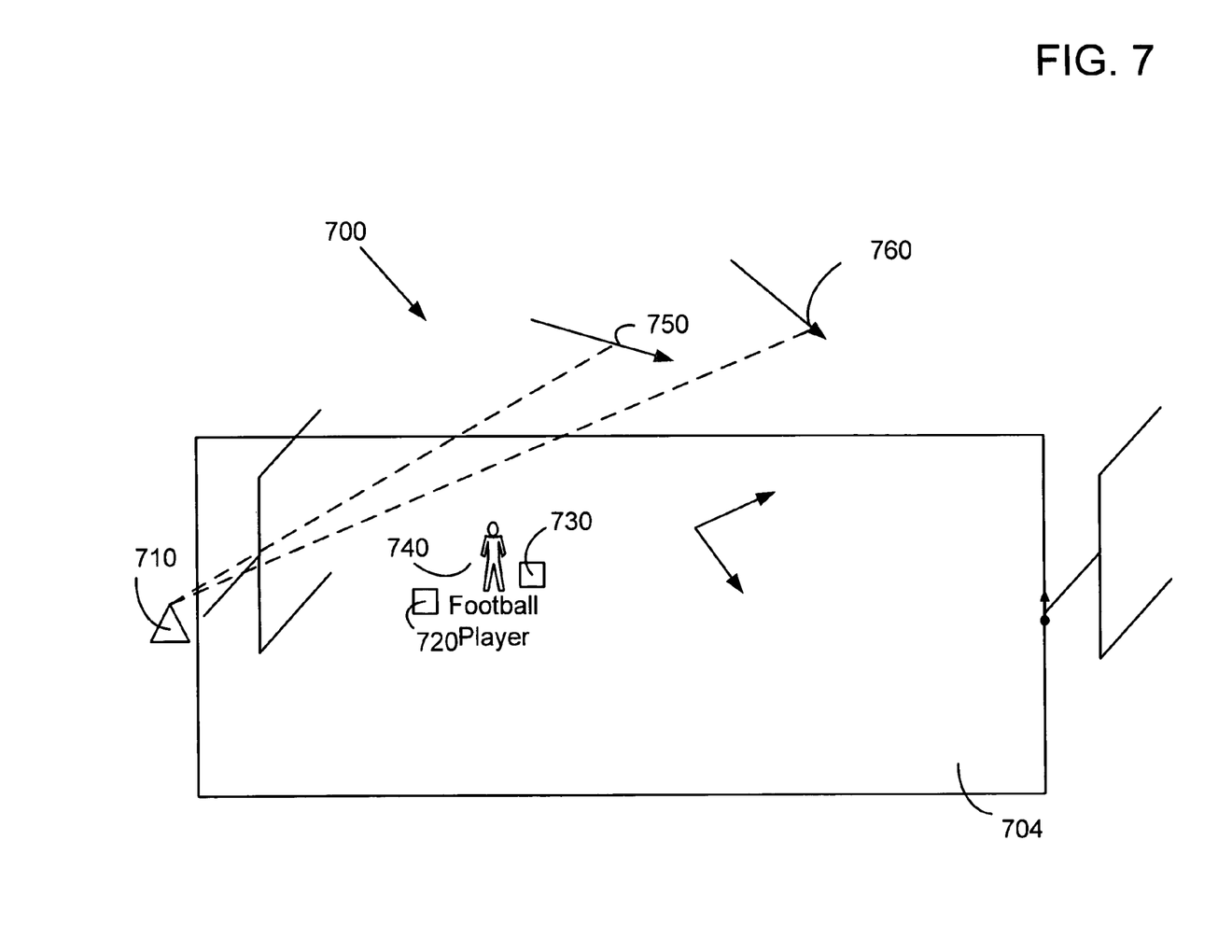
FIG. 7 is an exemplary football or field sport system in accordance with an exemplary embodiment.

Referring now to FIG. 7, a football system 700 is depicted. Football system 700 is depicted on a football field or playing area 704. System 700 further includes a wind profile detector 710 and a location device 720. A user interface device 730 is provided that provides information based on the wind profile from wind profile detector 710 and the location of, for example, a football player 740 from location device 720 to football player 740. Wind profile detector 710 may detect wind information remotely at various locations, such as but not limited to points 750 and 760.

Football system 700 may include one or more systems which may be but are not limited to a kicking system providing kicking information to a kicker, a passing system providing passing information to a passer, a player system providing information to a player, an opponent system providing information to an opponent, a team personnel system providing information to team personnel, an observer system providing information to an observer, etc.

In an exemplary embodiment, interface 730 may be in any of a variety of locations and configurations including but not limited to coupled in the helmet, coupled in the helmet and includes an audio interface, coupled in the helmet and includes a video interface, a wristband, a portable device, a visual display at the playing site, an interface device coupled to the stadium, an interface coupled to a player's apparel, etc. Further, in an exemplary embodiment the interface may provide a variety of information such as but not limited to information related to field goal kicking, information related to punting, information related to passing, etc. Wind profile and remote detecting equipment may be of any type as described earlier.

Figure 8:
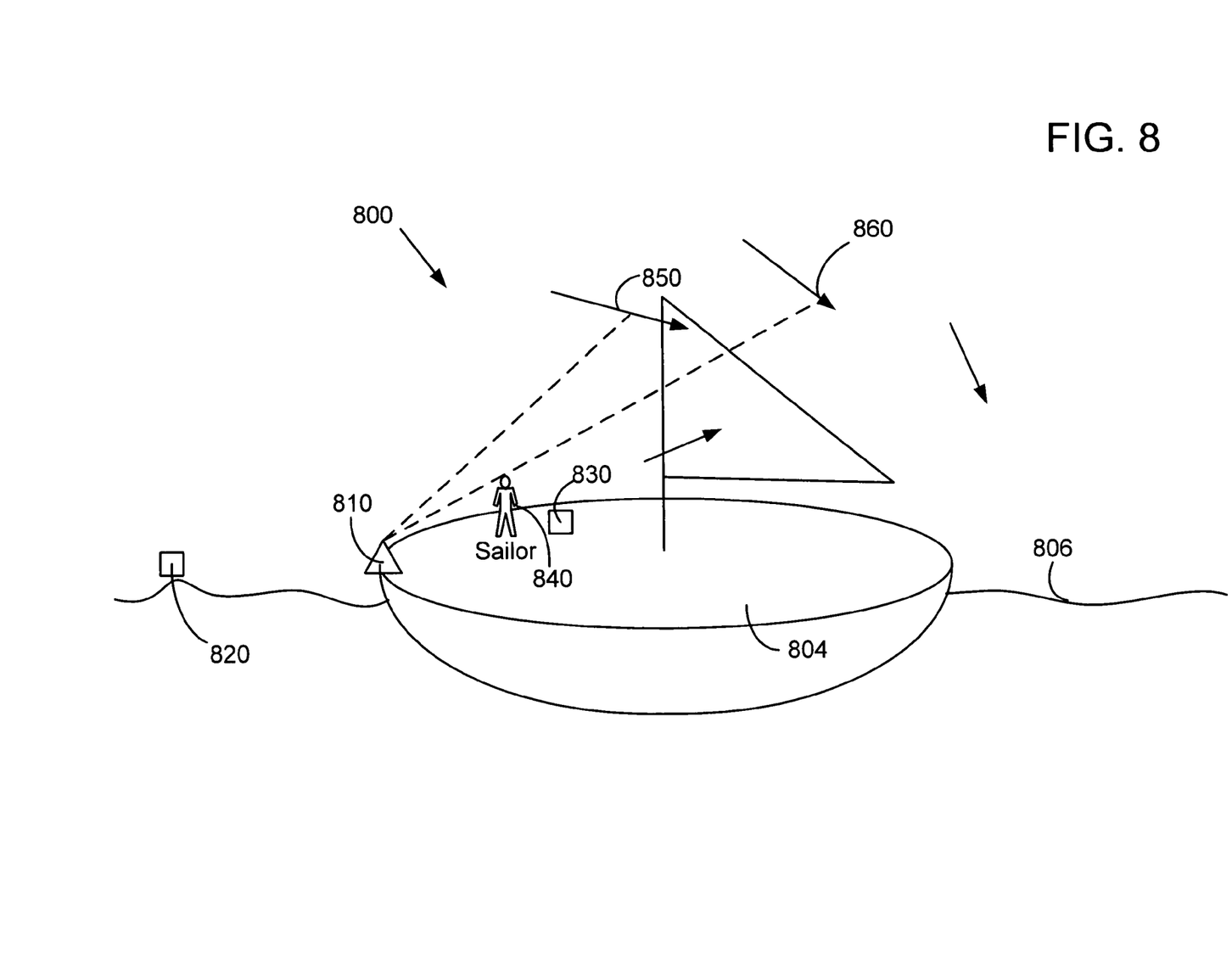
FIG. 8 is an exemplary sailing system or racing system in accordance with an exemplary embodiment.

Referring now to FIG. 8, a sailing system 800 is depicted. Sailing system 800 includes a sailing vessel 804 in a body of water 806. System 800 further includes a wind profile detector 810 and a location device 820. A user interface device 830 is provided that provides information based on the wind profile from wind profile detector 810 and the location of, for example, a sailor 840 or sailing vessel 804 from location device 820 to sailor 840 or sailing vessel 804. Wind profile detector 810 may detect wind information remotely at various locations, such as but not limited to points 850 and 860.

In an exemplary embodiment, sailing system 800 may be configured in any of a variety of ways including but not limited to being configured to detect wind profile information at locations along a potential route, etc. The user interface device 830 may provide various information including but not limited to sail configuration suggestions, rudder configuration suggestions, tacking suggestions, route planning suggestions, sail trimming suggestions, automatic sail configuration system control signals. In an exemplary embodiment the information may be provided to a variety of users including but not limited to a crew member of a boat, a crew member of a competitor's boat, an observer, etc. Wind profile and remote detecting equipment may be of any type as described earlier.

In an exemplary embodiment, a baseball system may be set up similar to the football system of FIG. 7. A baseball system may differ from the football system 700 in that a location device may be coupled to a base or other piece of equipment or site that is unique to a baseball playing environment. The information provided may also include information that is unique to baseball such as but not limited to a bat selection, a bat swing speed, hit direction, lateral ball deviation from a predetermined path, longitudinal ball deviation from a predetermined path, desired ball hit information, ball loft information. The information may be base on, among other things, an anticipated bat, an anticipated swing speed, an anticipated direction, an anticipated shot loft, an anticipated ball trajectory, anticipated ball parameters The user interface may be deployed at a baseball site, coupled to the baseball bat, coupled to the baseball glove, coupled to the baseball player's apparel. Wind profile and remote detecting equipment may be of any type as described earlier. The baseball system may be a batting system providing batting information to a batter, a pitching system providing pitching information to a pitcher, a fielding system providing fielding information to a fielder, an opponent system providing information to an opponent, a team personnel system providing information to team personnel, an observer system providing information to an observer, etc.

In an exemplary embodiment, a racing system may be set up similar to the sailing system of FIG. 8. A racing system may differ from the sailing system 800 in that a location device may be located around the track or race course or other piece of equipment or site that is unique to a racing environment. In an exemplary embodiment, the wind profile detector is configured to detect wind profile information at locations along a potential route and the user interface may provide, among other possibilities, vehicle configuration suggestions, route tracking suggestions, route planning suggestions, energy usage suggestions, etc. The user interface may be coupled to an automatic fuel system.

Each of the exemplary processes shown and described are only provided for example and other processes may be devised and used with the described systems.

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A golf system for use on a golf hole, comprising:
a wind profile sensor detecting wind profile information for a plurality of locations above the golf hole and remote from the wind profile sensor, wherein the wind profile sensor utilizes at least one of RADAR, LIDAR, SODAR, Doppler RADAR, and laser Doppler velocimetry, wherein the plurality of locations are along an estimated golf ball trajectory originating from a reference location, wherein the wind profile sensor measures wind speed and direction at two or more positions above the golf hole;
a computer simulation system generating an estimated ball destination resulting from a golf swing to be performed by a user at the reference location and in the presence of the detected wind profile information from the wind profile sensor;
a user interface device providing information based on the estimated ball destination.

2. The golf system of claim 1, wherein the information provides a suggested club selection.

3. The golf system of claim 1, wherein the information provides a suggested shot strength.

4. The golf system of claim 1, wherein the information provides a suggested shot direction.

5. The golf system of claim 1, wherein the information provides a suggested lateral ball deviation from a predetermined path.

6. The golf system of claim 1, wherein the information provides a suggested longitudinal ball deviation from a predetermined path.

7. The golf system of claim 1, wherein the information provides a suggested desired ball hook or slice information.

8. The golf system of claim 1, wherein the information provides recommended ball loft information.

9. The golf system of claim 1, wherein the information is based on an anticipated club.

10. The golf system of claim 1, wherein the information is based on an anticipated shot strength.

11. The golf system of claim 1, wherein the reference location is associated with a tee.

12. The golf system of claim 1, wherein the reference location is associated with a golfer's apparel.

13. The golf system of claim 1, wherein the reference location is associated with a golfer's equipment.

14. The golf system of claim 1, wherein the reference location is associated with golfer deployed equipment.

15. The golf system of claim 1, wherein the reference location is associated with site deployed equipment.

16. The golf system of claim 1, wherein the reference location is associated with a predetermined site.

17. The golf system of claim 1, wherein the information is based on an anticipated direction.

18. The golf system of claim 1, wherein the information is based on an anticipated shot loft.

19. The golf system of claim 1, wherein the information is based on an anticipated ball trajectory.

20. The golf system of claim 1, wherein the information is based on an anticipated ball parameters.

21. The golf system of claim 1, wherein the user interface device is deployed at a golf site.

22. The golf system of claim 1, wherein the user interface device is coupled to a golf club.

23. The golf system of claim 1, wherein the user interface device is coupled to a golf cart.

24. The golf system of claim 1, wherein the user interface device is coupled to a golfer's apparel.

25. The golf system of claim 1, wherein the user interface device is coupled to a golfer's body.

26. The golf system of claim 1, wherein the user interface device comprises a handheld device.

27. The golf system of claim 1, wherein the wind profile sensor provides the wind profile information extrapolated in time.

28. The golf system of claim 1, wherein the wind profile sensor provides the wind profile information interpolated in time.

29. The golf system of claim 1, wherein the wind profile sensor provides the wind profile information extrapolated in space.

30. The golf system of claim 1, wherein the wind profile sensor provides the wind profile information interpolated in space.

31. The golf system of claim 1, wherein the wind profile sensor provides the wind profile information evaluated along an anticipated trajectory.

32. The golf system of claim 1, wherein the user interface device provides information to a golfer.

33. The golf system of claim 1, wherein the user interface device provides information to a caddy.

34. The golf system of claim 1, wherein the user interface device provides information to an observer.

* * * * *